(12) United States Patent
Malabarba

(10) Patent No.: US 11,163,957 B2
(45) Date of Patent: Nov. 2, 2021

(54) PERFORMING SEMANTIC GRAPH SEARCH

(71) Applicant: International Business Machines Corporation, Armonk, NY (US)

(72) Inventor: Scott Malabarba, Huntington Beach, CA (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 15/638,269

(22) Filed: Jun. 29, 2017

(65) Prior Publication Data

US 2019/0005025 A1    Jan. 3, 2019

(51) Int. Cl.
| | |
|---|---|
| *G06F 16/30* | (2019.01) |
| *G06F 40/30* | (2020.01) |
| *G06F 40/295* | (2020.01) |
| *G06F 16/14* | (2019.01) |
| *G06F 16/901* | (2019.01) |

(52) U.S. Cl.
CPC ............ *G06F 40/30* (2020.01); *G06F 40/295* (2020.01); *G06F 16/14* (2019.01); *G06F 16/9024* (2019.01)

(58) Field of Classification Search
CPC .... G06F 16/14; G06F 16/9024; G06F 40/295; G06F 40/30
See application file for complete search history.

(56) References Cited

U.S. PATENT DOCUMENTS

| | | | |
|---|---|---|---|
| 7,152,065 B2 | 12/2006 | Behrens et al. | |
| 7,509,477 B2 | 3/2009 | Suponau et al. | |
| 8,370,361 B2 | 2/2013 | Topham et al. | |
| 8,782,061 B2 | 7/2014 | Agrawal et al. | |
| 10,387,575 B1 * | 8/2019 | Shen | G06F 40/268 |
| 2011/0238409 A1 * | 9/2011 | Larcheveque | G10L 15/1815 704/9 |
| 2012/0005224 A1 * | 1/2012 | Ahrens | H04W 4/21 707/769 |
| 2012/0221556 A1 * | 8/2012 | Byrne | G06F 16/367 707/723 |

(Continued)

OTHER PUBLICATIONS

Article entitled "A Scalable Distributed Parallel Breadth-First Search Algorithm on BlueGene", by Yoo et al., dated Jul. 20, 2005 (Year: 2005).*

(Continued)

*Primary Examiner* — Mahesh H Dwivedi

(74) *Attorney, Agent, or Firm* — Konrad Raynes Davda & Victor LLP; Janaki K. Davda

(57) ABSTRACT

Provided are techniques for performing entity-based semantic graph search. Semantic extraction is performed on content items to identify entities. A semantic graph is generated with a vertex for each of the content items, each of the entities, and each user associated with any of the content items and with edges between vertices representing relationships, wherein each of the edges is encoded with metadata about a type of a relationship and a strength of a relationship. A vertex structure is generated that contains identifiers of the content items, the entities, and each user mapped to vertices in the semantic graph. In response to receiving a search request with a search term, using the semantic graph and the vertex structure to identify search results for the search term.

18 Claims, 14 Drawing Sheets

(56) References Cited

U.S. PATENT DOCUMENTS

| | | | | |
|---|---|---|---|---|
| 2012/0221558 | A1* | 8/2012 | Byrne | G06F 17/30864 |
| | | | | 707/723 |
| 2013/0254739 | A1* | 9/2013 | Chen | G06F 8/70 |
| | | | | 717/102 |
| 2014/0279971 | A1* | 9/2014 | Bobick | G06F 16/951 |
| | | | | 707/693 |
| 2015/0348569 | A1* | 12/2015 | Allam | G10L 25/63 |
| | | | | 704/257 |
| 2016/0179965 | A1* | 6/2016 | Bhatia | G06F 16/9535 |
| | | | | 707/749 |
| 2017/0371860 | A1* | 12/2017 | McAteer | G06F 40/30 |
| 2019/0034780 | A1* | 1/2019 | Marin | G06N 3/006 |

OTHER PUBLICATIONS

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Sep. 2011, Computer Security Division Information Technology Laboratory National Institute of Standards and Technology, Total 7 pp.

* cited by examiner

PERFORMING SEMANTIC GRAPH SEARCH

FIELD

Embodiments of the invention relate to performing semantic graph search.

BACKGROUND

It is difficult to find relevant content items across multiple enterprise content repositories. An enterprise content repository may be described as a content repository of content items for a particular enterprise (e.g., a company, a government institution, etc.).

As enterprise content repositories grow, and work environments and cultures change, finding content items becomes more of a challenge. For example, even for a relatively new enterprise content repository, users may complain that content is difficult to find and organize. This problem may be encountered daily and may be a drain on productivity by, for example, requiring excess communication with other users or interfering with review processes.

Social network search techniques create a graph of users' social networks, based on profiles that the users have established using online social networking tools, communications over email, etc. Then, the social network search techniques use the graph to perform expert search, to perform context-sensitive search, and to make recommendations (e.g., to recommend contacts of other users). Such social network search techniques, however, work only with social networks.

Graph-based ranking techniques, such as a page ranking technique, rank results based on the number of connections to those results in a graph. However, such graph-based ranking techniques do not establish the connections; they rely on the graph having already been constructed based on techniques of connecting vertices such as web page links.

Pure text-based search techniques may involve lemmatization and other techniques to maximize flexibility in matching strings in content to search terms and computing a relevance score. The pure text-based search techniques are not graph-based.

SUMMARY

Provided is a method for performing semantic graph search. The method comprises: performing, with a processor of a computer, semantic extraction on content items to identify entities; generating a semantic graph with a vertex for each of the content items, each of the entities, and each user associated with any of the content items and with edges between vertices representing relationships, wherein each of the edges is encoded with metadata about a type of a relationship and a strength of a relationship; generating a vertex structure that contains identifiers of the content items, the entities, and each user mapped to vertices in the semantic graph; and, in response to receiving a search request with a search term, using the semantic graph and the vertex structure to identify search results for the search term.

Provided is a computer program product for performing semantic graph search. The computer program product comprises a computer readable storage medium having program code embodied therewith, the program code executable by at least one processor to perform operations of: performing semantic extraction on content items to identify entities; generating a semantic graph with a vertex for each of the content items, each of the entities, and each user associated with any of the content items and with edges between vertices representing relationships, wherein each of the edges is encoded with metadata about a type of a relationship and a strength of a relationship; generating a vertex structure that contains identifiers of the content items, the entities, and each user mapped to vertices in the semantic graph; and, in response to receiving a search request with a search term, using the semantic graph and the vertex structure to identify search results for the search term.

Provided is a computer system for performing semantic graph search. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: performing semantic extraction on content items to identify entities; generating a semantic graph with a vertex for each of the content items, each of the entities, and each user associated with any of the content items and with edges between vertices representing relationships, wherein each of the edges is encoded with metadata about a type of a relationship and a strength of a relationship; generating a vertex structure that contains identifiers of the content items, the entities, and each user mapped to vertices in the semantic graph; and, in response to receiving a search request with a search term, using the semantic graph and the vertex structure to identify search results for the search term.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
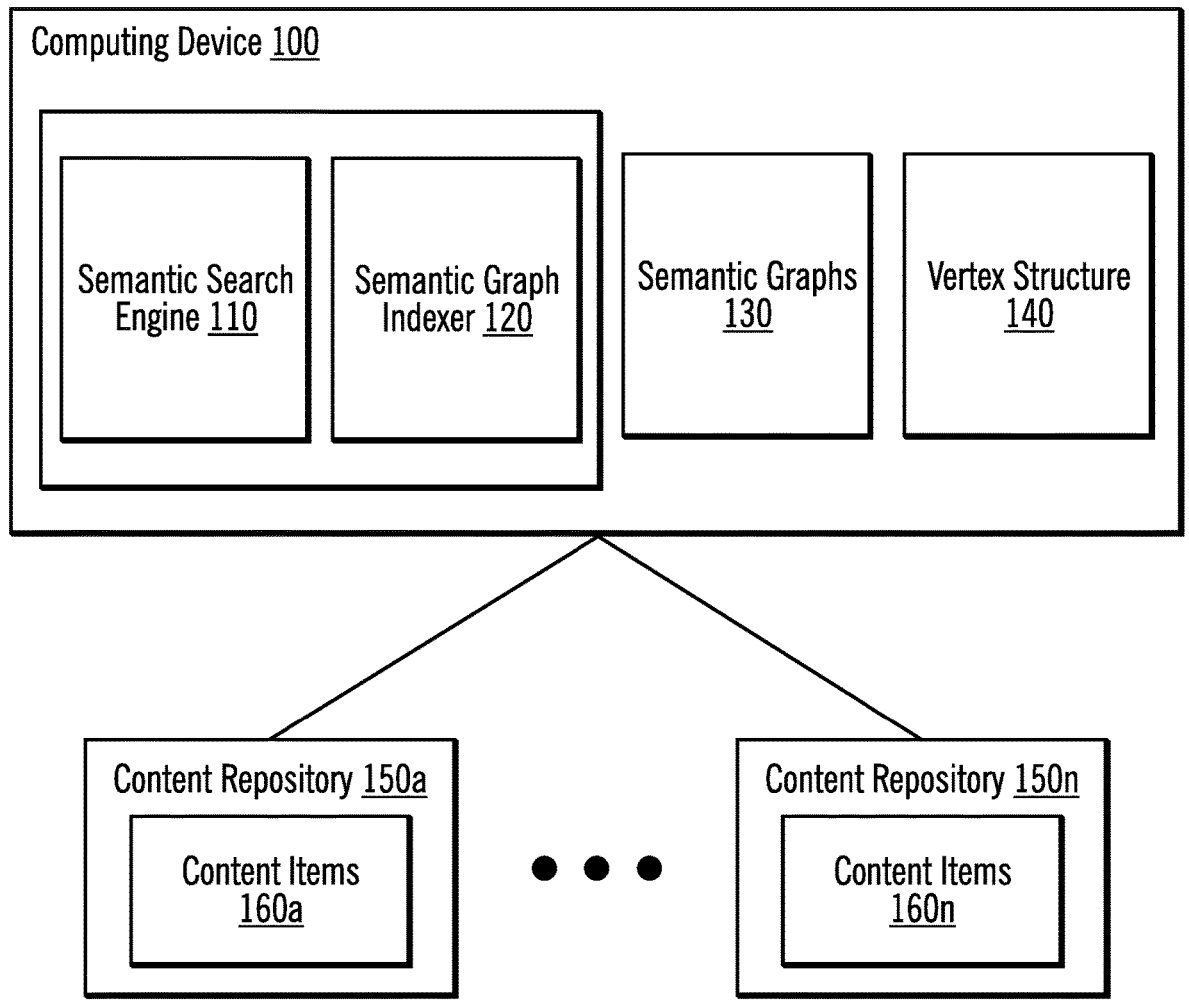
FIG. 1 illustrates, in a block diagram, a computing environment in accordance with certain embodiments.

FIG. 1 illustrates, in a block diagram, a computing environment in accordance with certain embodiments. A computing device 100 includes a semantic search engine 110, a semantic graph indexer 120, semantic graphs 130, and a vertex structure 140 for each of the semantic graphs 130. The semantic graph indexer 120 creates and updates the semantic graphs 130 and the vertex structure 140. The semantic search engine 110 responds to search queries using the semantic graphs.

With embodiments, the search engine 110 and the semantic graph indexer 120 communicate to perform searches. Although the semantic search engine 110 and the semantic graph indexer 120 are illustrated as separate components in FIG. 1, in certain embodiments, one component may perform the functions of the semantic search engine 110 and the semantic graph indexer 120.

The computing device 100 is coupled to content repositories 150a . . . 150n. These may be enterprise content repositories. Each of the content repositories 150a . . . 150n stores content items. For example, content repository 150a stores content items 160a, while content repository 150n stores content items 160n. The content items 160a, 160n may be described as a subset of entities. The content items 160a, 160n include, for example, documents, comments on documents, chat transcripts, forum archives, wiki pages, web pages, source code files, etc. With embodiments, a proper name (e.g., of a person, city, etc.) or a term/topic is an entity but not a content item.

Unlike social network search techniques, graph-based ranking techniques, and pure text-based search techniques, the semantic graph indexer 120 extracts entities and performs semantic analysis on content items. Also, unlike social network search techniques, the semantic graph indexer 120 includes abstract entities, such as topics, in the semantic graph. The semantic graph indexer 120 extends to semantic extraction and, thus, has greater insight into the topic or subject of content items. The semantic graph indexer 120 is graph-based and is able to find or rank content items based on relationships to other content items or users.

The semantic graph indexer 120 performs semantic extraction on searchable content items and indexes these into a single, unified semantic graph. The semantic search engine 110 establishes entities for search terms and then performs a breadth-first search of the single, unified semantic graph, beginning with the search entity, to rank relevant content items based on number, type, and strength of connecting edges in the single, unified semantic graph.

The semantic graph indexer 120 takes into account the meaning of searchable content items and the number and strength of relationships to other content items and to people. Thus, the semantic graph indexer 120 addresses use cases that pure text-based or social search cannot.

Semantic extraction and normalization allow the semantic graph indexer 120 to combine content from multiple heterogeneous content repositories into a single semantic graph. Then, the semantic search engine 110 searches that semantic graph to find relationships across those multiple heterogeneous content repositories. For example, the semantic search engine 110 working with the semantic graph indexer 120 may use forum comments in repository A to identify a relevant document in repository B.

Finally, the semantic search engine 110 is able to search for, or filter on, any type of entity (e.g., topic or proper name), content item (e.g., document, forum posting, etc.), or user. This allows the semantic search engine 110 to support use cases that, with other techniques, require separate applications and infrastructure.

Figure 2:
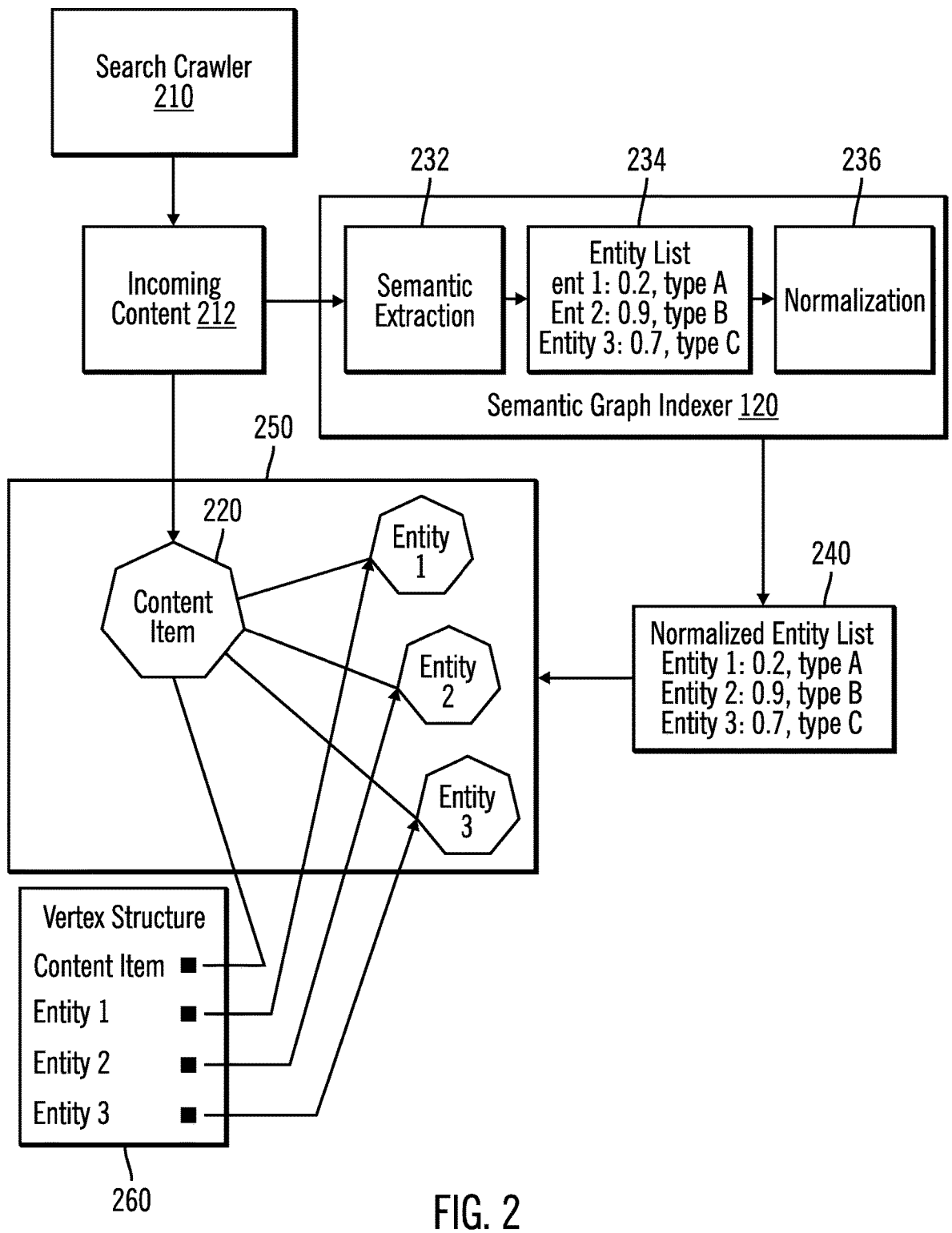
FIG. 2 illustrates operations for indexing content items in accordance with certain embodiments.

FIG. 2 illustrates, in a workflow, operations for indexing content items in accordance with certain embodiments. FIG. 2 contains high-level components, each of which, in practice, may comprise a number of programs, routines, or services.

Initially, a search crawler 210 locates incoming content 212 in a content repository and retrieves the incoming content 212. With embodiments, the incoming content 212 includes both content items and metadata. The metadata includes the type of the relationship and strength of the relationship between two entities. With embodiments, the metadata may be part of the content items (e.g., included within a document) or stored separately, but linked to the content items. With embodiments, the incoming content 212 may include new or modified content items. With embodiments, the content items from the incoming content 212 are used to create vertices in the semantic graph 250. With embodiments, the metadata for the content items is used to create edges in the semantic graph 250 between the vertices. Merely for simplicity of illustration, one content item 220 is illustrated in FIG. 2, but any number of content items may be included in the semantic graph. Additionally, the incoming content 212 is sent to a semantic graph indexer 120.

Once the search crawler has retrieved content, the semantic graph indexer 120 takes over. The semantic graph indexer 120 may be described as a component, or set of components, that performs semantic extraction and injects the resulting entities into the semantic graph 250.

The semantic graph indexer 120 performs semantic extraction 232 to output an entity list 234 with entities and metadata. Semantic extraction techniques may include, but are not limited to, entity extraction, keyword extraction, concept expansion, and natural language processing. Each of these semantic extraction techniques produces a set of entities that are referenced in the indexed content items. Some semantic extraction techniques may include additional metadata, such as a relevance score or a confidence score. With embodiments one or more of these semantic extraction techniques may be used for semantic extraction.

Then, the semantic graph indexer 120 performs normalization 236 on the entity list 234 to output a normalized entity list 240 with entities and metadata. Normalization may include performing any technique for data normalization and cleansing to eliminate false duplicates, such as lemmatization, name matching, and others. For example, the entity list 234 has "ent1", "Ent2", and "Entity3", and these are normalized to "Entity 1", "Entity 2", and "Entity 3". Also, "Entity 1" has type of relationship "A" and strength of relationship "0.2"; "Entity 2" has type of relationship "B" and strength of relationship "0.9", and "Entity 3" has type of relationship "C" and strength of relationship "0.7".

The normalized entity list 240 may be described as a transient artifact containing the final set of entities and metadata to be injected into the semantic graph 250.

After normalization, the semantic graph indexer 120 constructs the semantic graph 250. With embodiments, the semantic graph 250 may also be referred to as a graph index.

In addition, the semantic graph indexer 120 creates the vertex structure 260. The vertex structure 260 contains normalized entity identifiers mapped to vertices for the entities in the semantic graph 250. The vertex structure 260 also includes a content item identifier mapped to a vertex for the content item in the semantic graph 250. The vertex structure 260 is used for efficient lookup of entities that have previously been ingested. With embodiments, the vertex structure 260 is a hash table. Although the vertex structure 260 does not illustrate users, the vertex structure 260 may include user identifiers mapped to vertices for users in the semantic graph 250.

With embodiments, the semantic graph 250 contains vertices for the content items ingested and for the entities extracted from those content items. With embodiments, the vertices are entities, content items, and users. Entities include content items. For example, entities include: topics, proper names, documents, comments, tags, keywords, etc.

Because it is useful to depict different types of vertices to show how the semantic graph is constructed and, later, searched, the semantic graph 250 shows entities, content items, and users and how they are related.

Figure 3:
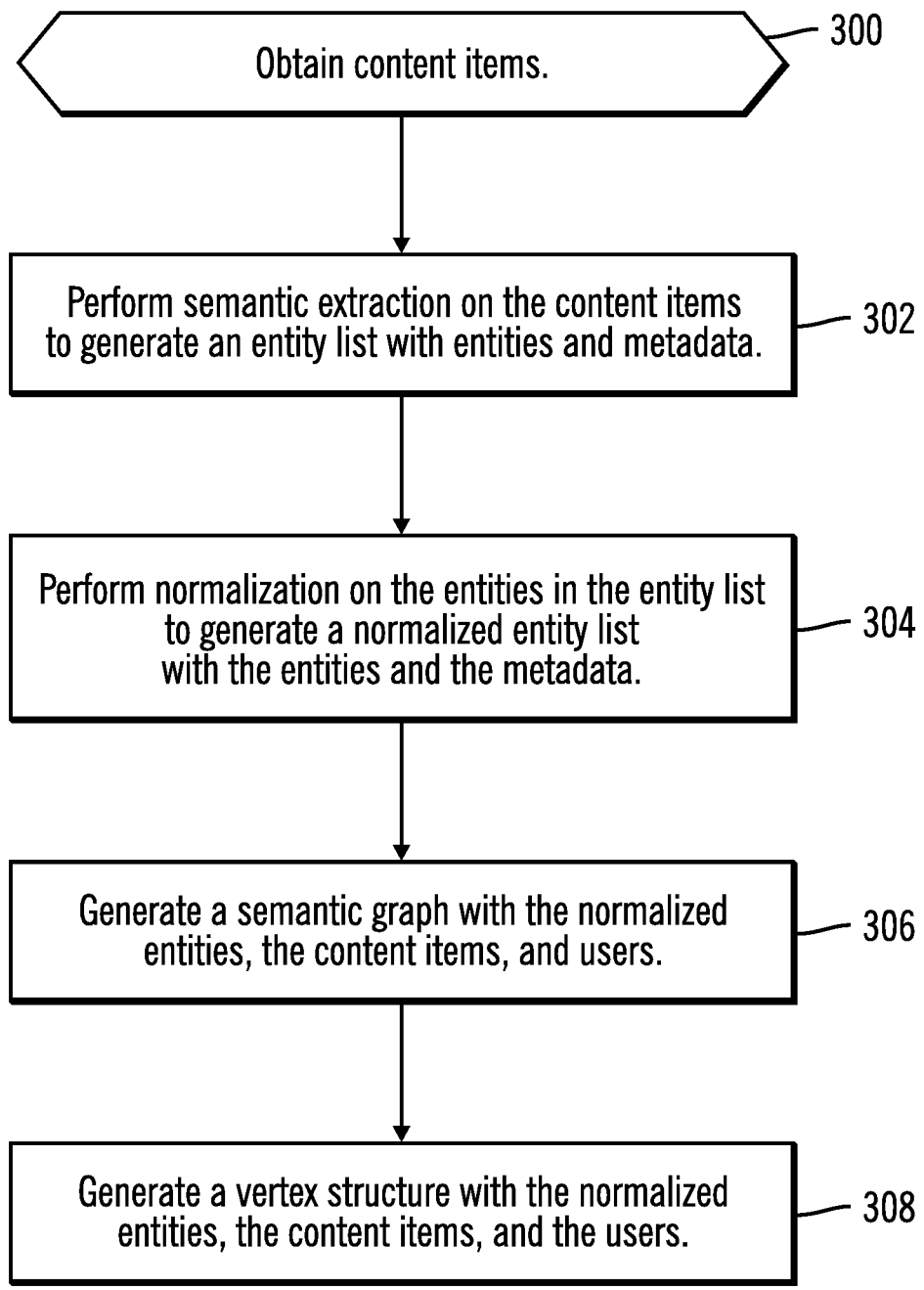
FIG. 3 illustrates, in a flowchart, operations for creating a semantic graph, in accordance with certain embodiments.

FIG. 3 illustrates, in a flowchart, operations for creating a semantic graph, in accordance with certain embodiments. Control begins at block 300 with the semantic graph indexer 120 obtaining content items (e.g., from a search crawler). In block 302, the semantic graph indexer 120 performs semantic extraction on the content items to generate an entity list with entities and metadata.

In block 304, the semantic graph indexer 120 performs normalization on the entities in the entity list to generate a normalized entity list with the entities and metadata. Normalization produces a normalized entity list that contains the final set of entities and their metadata. For example, different content repositories may use different techniques to represent a given user's identity: email address, full name, or Identification (ID) number. The normalization process reconciles incoming records and uses a single identifier, such as email address, to represent the user. As another example, the tags "search-dev", "search_dev", and "search-development" are very similar and may be normalized to a single term "search-development".

In block 306, the semantic graph indexer 120 generates a semantic graph with the normalized entities, the content items, and users. With embodiments, the users may be identified using metadata associating the users with the content items. Such metadata for a content item may identify, for example, a user who created the content item, a user who accessed or viewed the content item, a user who created a copy of the content item, a user who created a Portable Data Format (PDF) version of the content item, etc. For example, the "creator" field on a document or an "@" mention in a comment or posting may be used to identify a user associated with the content items In block 308, the semantic graph indexer 120 generates a vertex structure with the normalized entities, the content items, and users. With embodiments, the semantic graph indexer 120 generates the graph before generating the vertex structure. That is, the vertex for each incoming entity is generated before the vertex structure table entry for that entity is generated. The vertex structure entry for an entity contains a reference to the graph vertex for that entity. With embodiments, for each of the normalized entities, the content items, and the users, the vertex structure includes an identifier and a pointer to a vertex in the semantic graph.

Figure 4A:
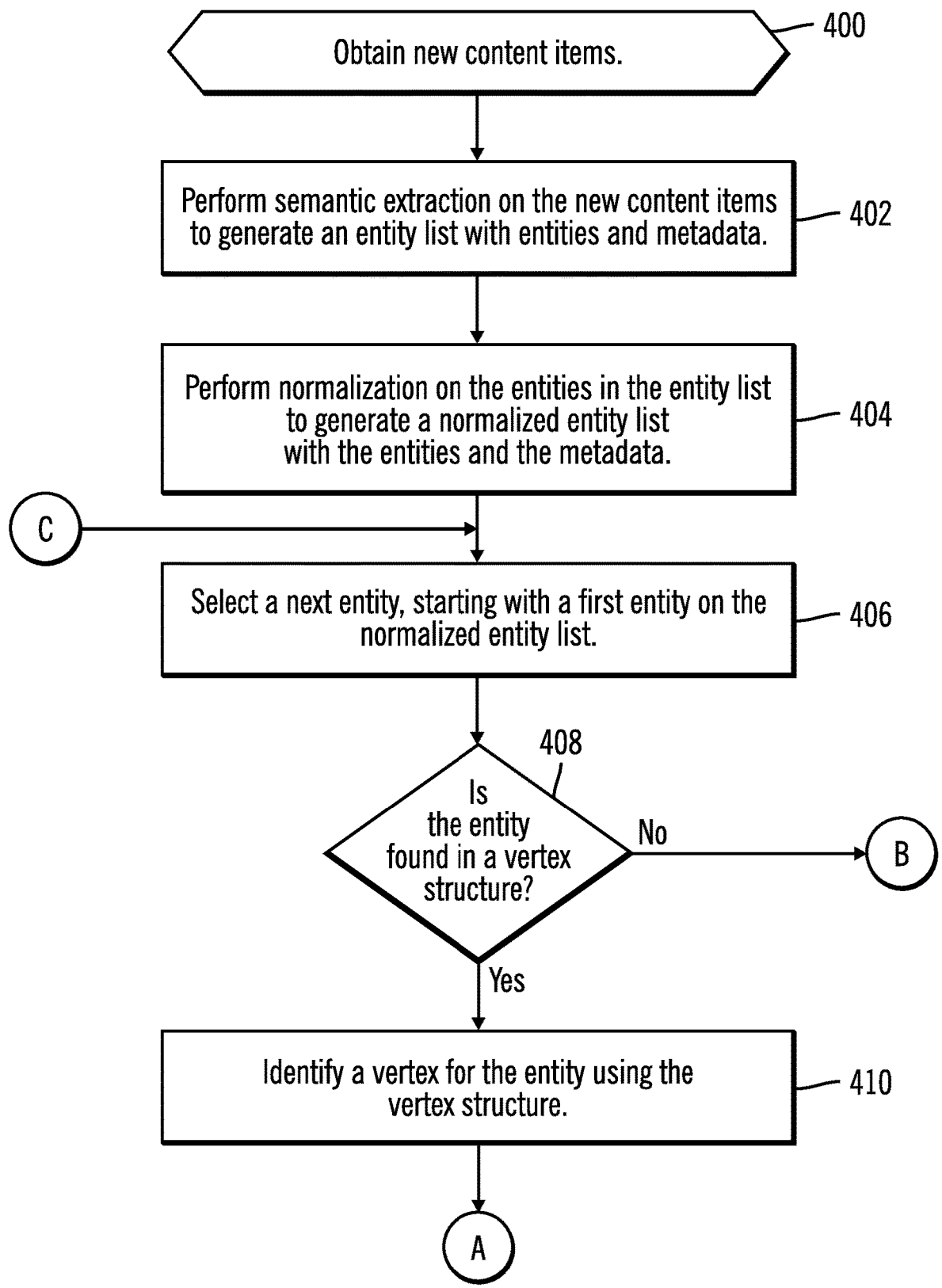
FIGS. 4A and 4B illustrate, in a flowchart, operations for updating a semantic graph, in accordance with certain embodiments.
Figure 4B:
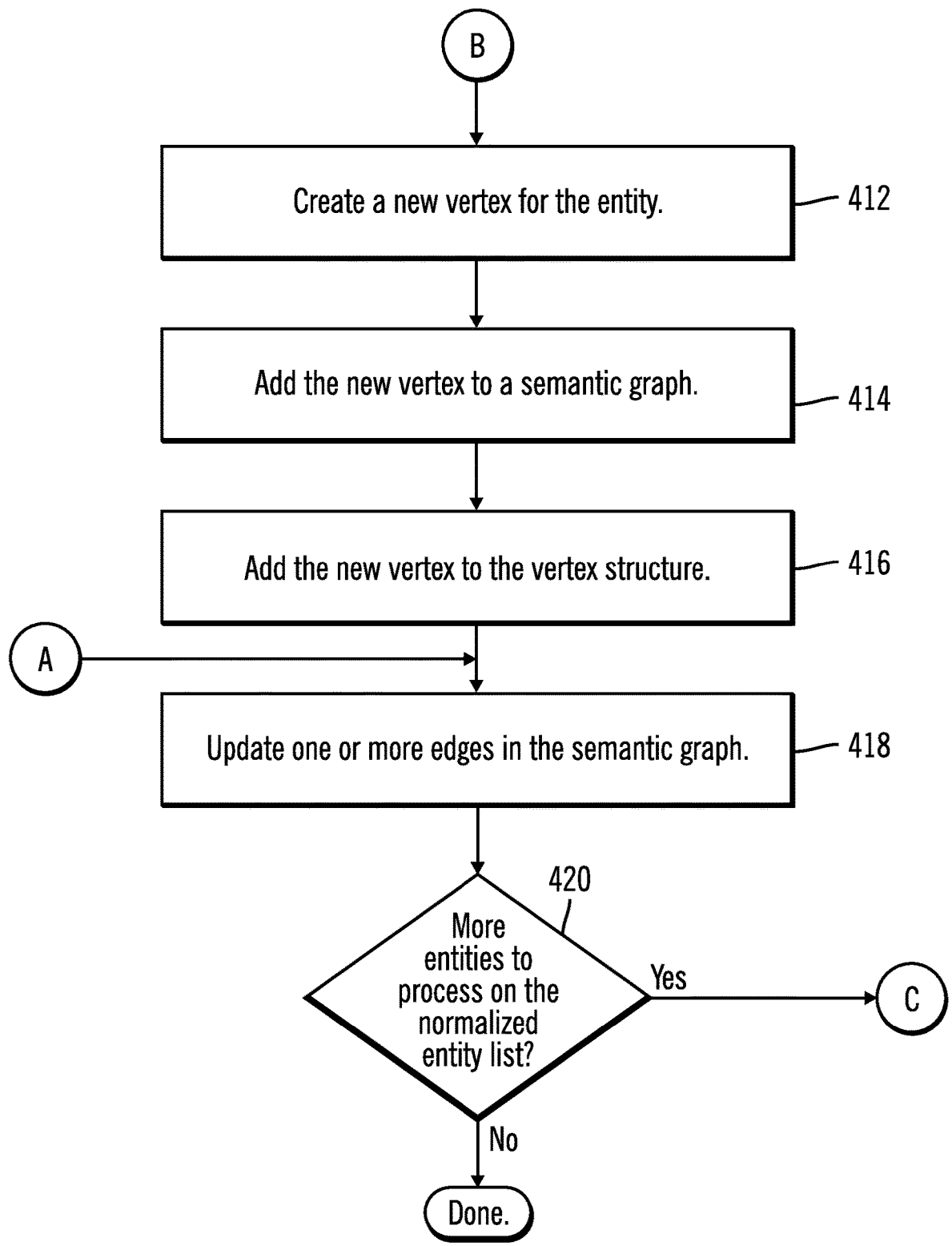

FIGS. 4A and 4B illustrate, in a flowchart, operations for updating a semantic graph, in accordance with certain embodiments. Control begins at block 400 with the semantic graph indexer 120 obtaining new content items (e.g., from a search crawler). In block 402, the semantic graph indexer 120 performs semantic extraction on the new content items to generate an entity list with entities and metadata. In block 404, the semantic graph indexer 120 performs normalization on the entities in the entity list to generate a normalized entity list with the entities and metadata.

In block 406, the semantic graph indexer 120 selects a next entity, starting with a first entity on the normalized entity list. In block 408, the semantic graph indexer 120 determines whether the entity is in the vertex structure. If so, processing continues to block 410, otherwise, processing continues to block 412 (FIG. 4B).

In block 410, the semantic graph indexer 120 identifies a vertex for the entity using the vertex structure. From block 410 (FIG. 4A), processing continues to block 418 (FIG. 4B).

In block 412, the semantic graph indexer 120 creates a new vertex for the entity. In block 414, the semantic graph indexer 120 adds the new vertex to a semantic graph. In block 416, the semantic graph indexer 120 adds the new vertex to the vertex structure. In block 418, the semantic graph indexer 120 updates one or more edges in the semantic graph. With embodiments, the one or more edges are updated for either the new vertex created in block 412 or for the vertex identified in the vertex structure in block 410.

In block 420, the semantic graph indexer 120 determines whether there are more entities to process on the normalized entity list. If so, processing continues to block 406 (FIG. 4A), otherwise, processing of the on the normalized entity list is done.

Thus, with embodiments, the semantic graph indexer 120 attempts to look up each incoming entity in the vertex structure 260. This is done for efficient access to the vertices for entities that have previously been indexed. If the vertex structure 260 already contains a vertex for an entity, then the semantic graph indexer 120 may use that existing vertex (without creating a new vertex for the entity). Otherwise, the semantic graph indexer 120 creates a new vertex for the entity in the semantic graph and adds the vertex to the vertex structure 260. With embodiments, for a hash table, the vertex is keyed off the normalized value. That is, the semantic graph indexer 120 inserts a reference to the new vertex into the vertex structure by generating a key, or hash value, for the vertex. This key is generated from the normalized form of the entity so that, for example, different vertices are not created for "COMPUTER" and "computer". Finally, the semantic graph indexer 120 updates the semantic graph by creating new edges between any vertices created or identified using the vertex structure 260. With embodiments, because the edges represent relationships, metadata about relationships between vertices is used to create the edges.

With embodiments, vertices represent entities and edges represent relationships between the vertices. Edges have metadata, and this metadata encodes the type of the relationship and the strength of the relationship between two connected entities. For example, a user vertex may be linked to a document vertex by an "author" edge or a "mentions" edge. The "author" and "mentions" provide metadata about relationships. A document may be linked to a keyword vertex by a "subject" edge or a "references" edge. With embodiments, an "entity" or "subject" edge may have a relevance or confidence score attached to it.

Figure 5:
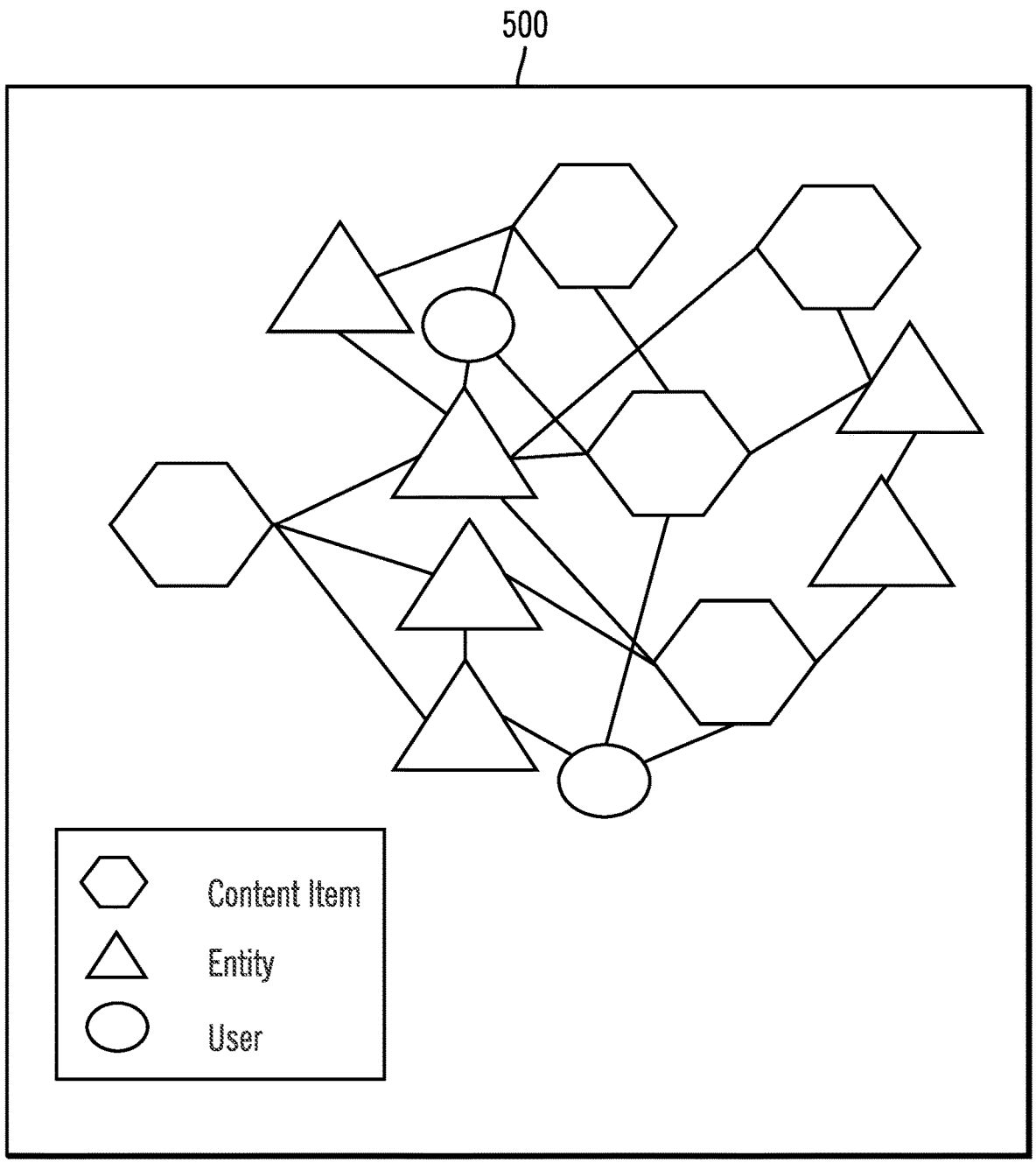
FIG. 5 illustrates a semantic graph in accordance with certain embodiments.

FIG. 5 illustrates a semantic graph 500 in accordance with certain embodiments. The semantic graph 500 has vertices representing different types of entities. With embodiments, different types of shapes may be used to represent different types of entities, different colors may be used to represent different types of entities, etc. Such a representation of different types of entities makes it easy to identify the different types of entities in the semantic graph.

The entities are connected by edges. Each of the edges is encoded with metadata about the type of the relationship and the strength of the relationship between the two entities that are connected by that edge. The vertices in the semantic graph 500 include vertices for content items, entities, and users (e.g., creators, owners or viewers of content items).

With embodiments, once the semantic graph and associated data structures have been constructed, the semantic graph indexer may ingest new content items and update the semantic graph. The semantic search engine 110 may use the semantic graph to perform a search in response to a search query.

The semantic search engine 110 searches the semantic graph using several operations. At a high level, the search strategy is to start a breadth-first search from an origin vertex (i.e., search origin or starting vertex) representing a search term, continue until a configured number of target vertices have been visited, and rank the target vertices as results based on a total weight of the paths to each target vertex. A path starts at the origin vertex and ends at a target vertex. The weight of a path is a sum of the strength of each edge of that path. With embodiments, the ranking may also be based on the type of relationship. With embodiments, any vertex in the semantic graph may be an origin vertex and/or a target vertex of a path.

FIGS. 6A, 6B, 6C, and 6D illustrated, in a flowchart, operations for performing a search using a semantic graph in accordance with certain embodiments.

Control begins at block 600 with the semantic search engine 110 receiving a search request with one or more search terms. In block 602, the semantic search engine 110 identifies an entity for each of the one or more search terms to form a list of search entities. In block 604, the semantic search engine 110 selects a next entity, starting with a first entity from the list of search entities.

In block 606, the semantic search engine 110 determines whether the entity is found in a vertex structure. If so, processing continues to block 608. Otherwise, processing continues to block 618. With embodiments, the semantic search engine 110 passes control to the semantic graph indexer 120 to perform the operations of blocks 618-624. Then, the semantic graph indexer 120 returns control to the semantic search engine 110 to perform the operations of block 626.

Figure 6A:
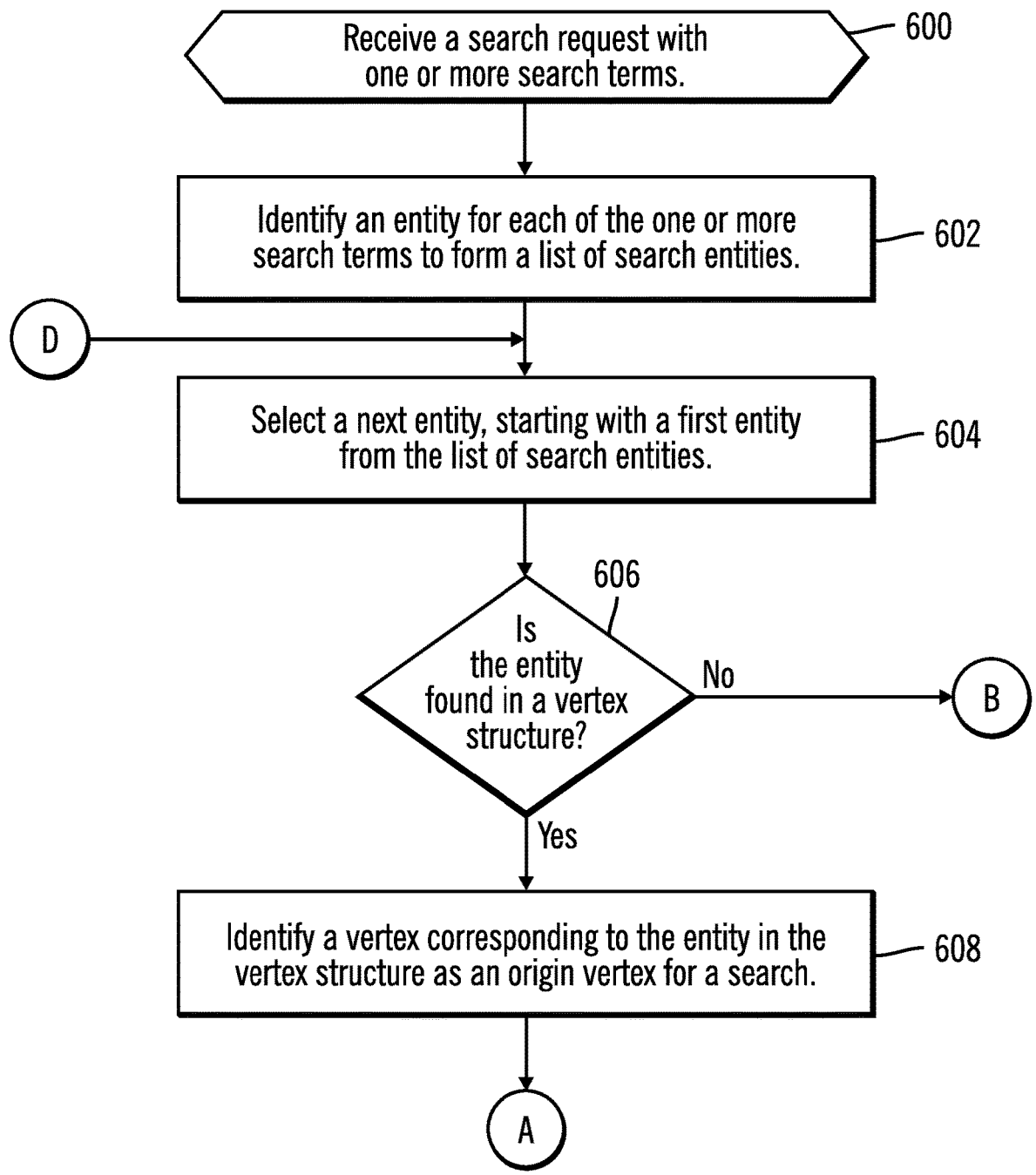
FIGS. 6A, 6B, 6C, and 6D illustrated, in a flowchart, operations for performing a search using a semantic graph in accordance with certain embodiments.
Figure 6B:
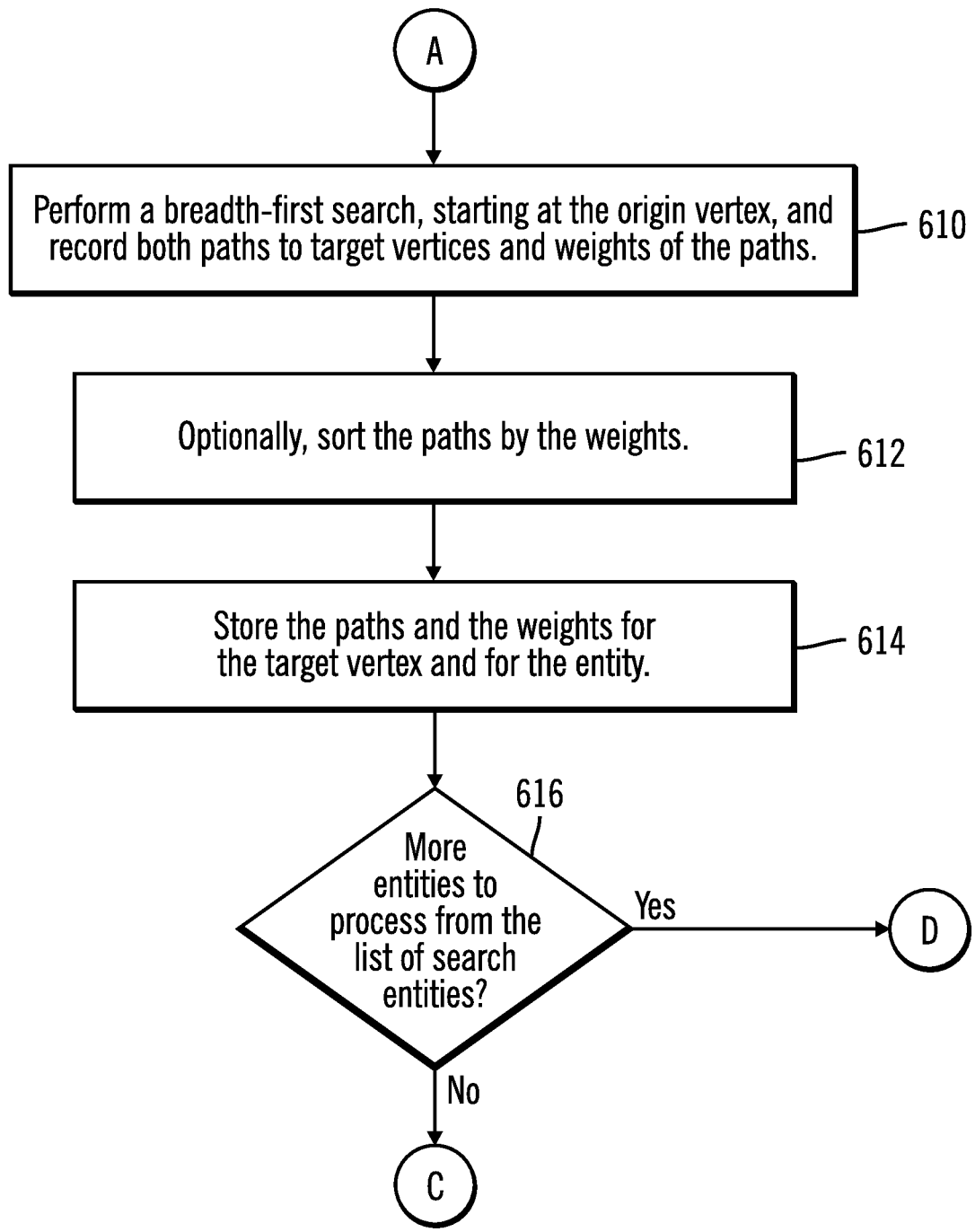
Figure 6C:
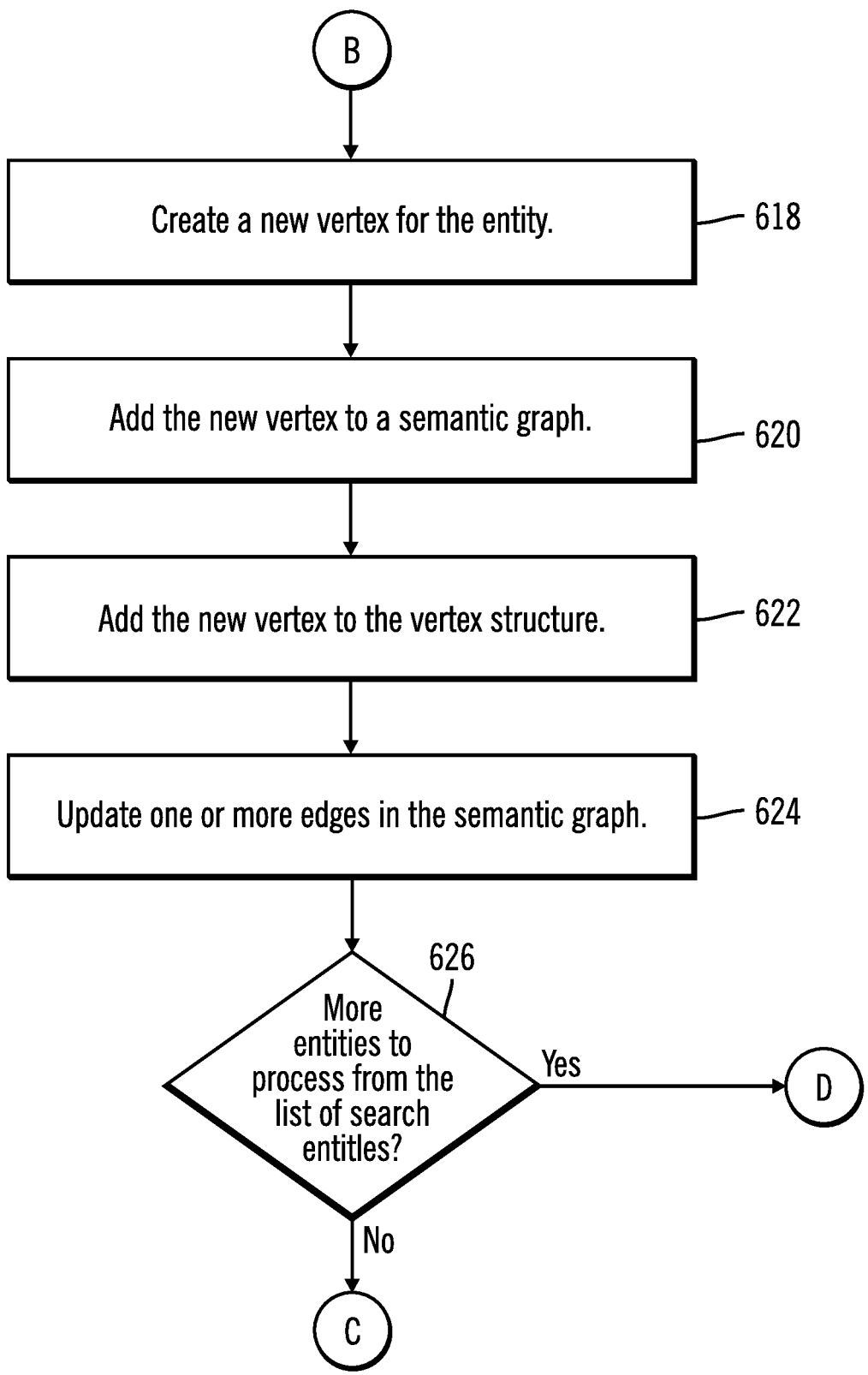

In block 608, the semantic search engine 110 identifies a vertex corresponding to the entity in the vertex structure, as an origin vertex for a search. From block 608 (FIG. 6A), processing continues to block 610 (FIG. 6B).

In block 610, the semantic search engine 110 performs a breadth-first search, starting at the origin vertex, and records both paths to target vertices and weights of the paths. A path starts at the origin vertex and ends at a target vertex. The weight of a path is a sum of the strength of each edge of that path. In block 612, the semantic search engine 110, optionally, sorts the paths by the weights. In block 614, the semantic search engine 110 stores the paths and the weights for the target vertex and for the entity. With embodiments, the paths and weights may also be stored for the origin vertex.

As an example, if there are 3 paths found in the semantic graph or an origin vertex to a target vertex, with weights of 0.1, 0.2, and 0.3, respectively, then these paths and weights are stored for the target vertex and for the entity.

With embodiments, when the semantic graph is displayed, in response to selection of an entity, the semantic search engine 110 displays (e.g., highlights in the semantic graph) the paths for the entity, starting with an origin vertex associated with that entity. With embodiments, when the semantic graph is displayed, in response to selection of any vertex, the semantic search engine 110 displays (e.g., highlights in the semantic graph) the paths starting at that vertex.

Figure 6D:
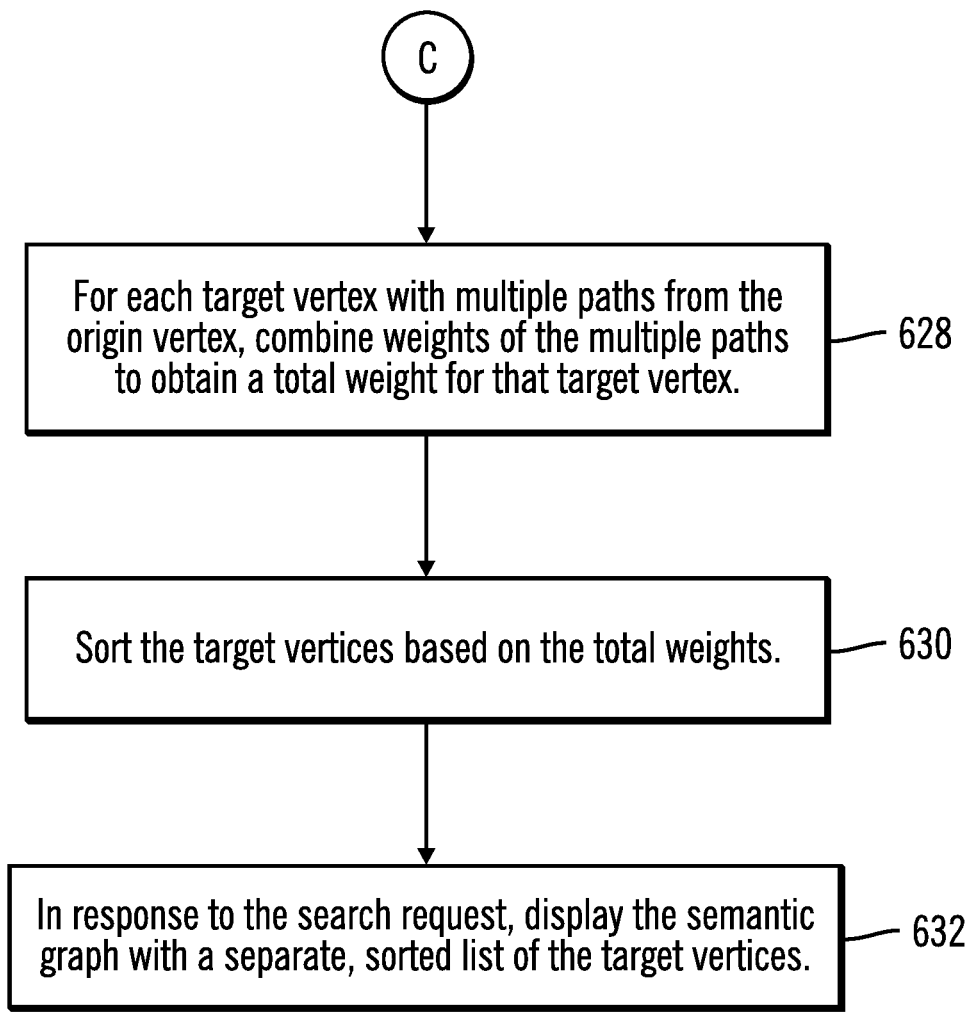

In block 616, the semantic search engine 110 determines whether there are more entities to process from the list of search entities. If so, processing continues to block 604 (FIG. 6A), otherwise, processing continues to block 628 (FIG. 6D).

In block 618, the semantic graph indexer 120 creates a new vertex for the entity. In block 620, the semantic graph indexer 120 adds the new vertex to a semantic graph. In block 622, the semantic graph indexer 120 adds the new vertex to the vertex structure. In block 624, the semantic graph indexer 120 updates one or more edges in the semantic graph. With embodiments, the one or more edges are updated for the new vertex created in block 618. In block 626, the search engine 110 (which receives control back from the semantic graph indexer 120) determines whether there are more entities to process from the list of search entities. If so, processing continues to block 604 (FIG. 6A), otherwise, processing continues to block 628 (FIG. 6D).

In block 628, for each target vertex with multiple paths from the origin vertex, the semantic search engine 110 combines weights of the multiple paths to obtain a total weight for that target vertex. As an example, for a target vertex, if there are 3 paths found in the semantic graph, with weights of 0.1, 0.2, and 0.3, then the total weight of 0.6 is stored for the target vertex. The total weight may be stored for each of the target vertices.

In block 630, the semantic search engine 110 sorts the target vertices based on the total weights. For example, a target vertex with a weight of 0.9 is sorted higher than a target vertex with a weight of 0.5. In block 632, in response to the search request (of block 600, FIG. 6A), the semantic search engine 110 displays the semantic graph with a separate, sorted list of target vertices. The semantic search engine 110 provides the separate, sorted list of target vertices as search results in response to the search request.

With embodiments, the target vertices in the separate, sorted list may be filtered based on a type of the relationships or may be further ordered based on the types of relationships.

Because the semantic search engine 110 looks at total weight of a target vertex, which is a sum of weights of each path from the origin vertex to that target vertex, then a target vertex that may be reached by different paths from the same origin vertex may be ranked higher and deemed more relevant in response to a search. Such a target vertex may also have a higher associated relevance score indicating relevance.

With embodiments, the semantic search engine 110 establishes one or more entities based on the search terms. For example, consider a single search term, such as "computer purchase" or "cognitive computing". With embodiments, the semantic search engine 110 establishes one or more entities for the search term. This may be a straightforward mapping of a word or a multi-word name to a single entity. With embodiments, semantic extraction may be performed on the search input itself to produce one more search entities.

Once the search entity is established, the semantic search engine 110 looks up the entity in the vertex structure. If an entry exists for the entity, then the corresponding vertex becomes the origin vertex. If an entry does not exist for the entity, then a new vertex is created an added to the graph. If a single-entity search does not have a pre-existing vertex, the search ends here as no previously indexed content has been found to be related to the search term.

Next, a breadth-first search is initiated, starting at the origin vertex. Each target vertex visited, and the total weight of the path traversed to reach the target vertex (of the path) from the origin vertex, is recorded in a results list. In certain embodiments, with each edge traversed away from the origin vertex, the total weight of the resulting path is decreased by a preconfigured percentage. With embodiments, the breadth-first search continues until either all target vertices of the semantic graph have been visited or until a preconfigured boundary is met (e.g., a pre-determined amount of time has elapsed or a pre-determined number of target vertices visited is exceeded).

Finally, the results list is sorted by path weight. Target vertices with higher total weights for paths are higher quality and are returned first. If a given target vertex appears multiple times in the results list (that is, it was reached by multiple paths from the origin vertex), the path weights are added to make for a single combined result entry.

Both traversal and result list generation may be filtered by edge or vertex type to restrict search results to a particular type of vertex or type of relationship. For example, there may be filtering for expert search or social network suggestion.

The process for a multi-term search builds on single-term search. Multiple searches are run, one for each search term. The result lists are combined and sorted based on total path weight. That is, the path weights for each search are added together before sorting. As an additional refinement, new edges may be created between the search term entity vertices to increase the quality of the graph.

Figure 7:
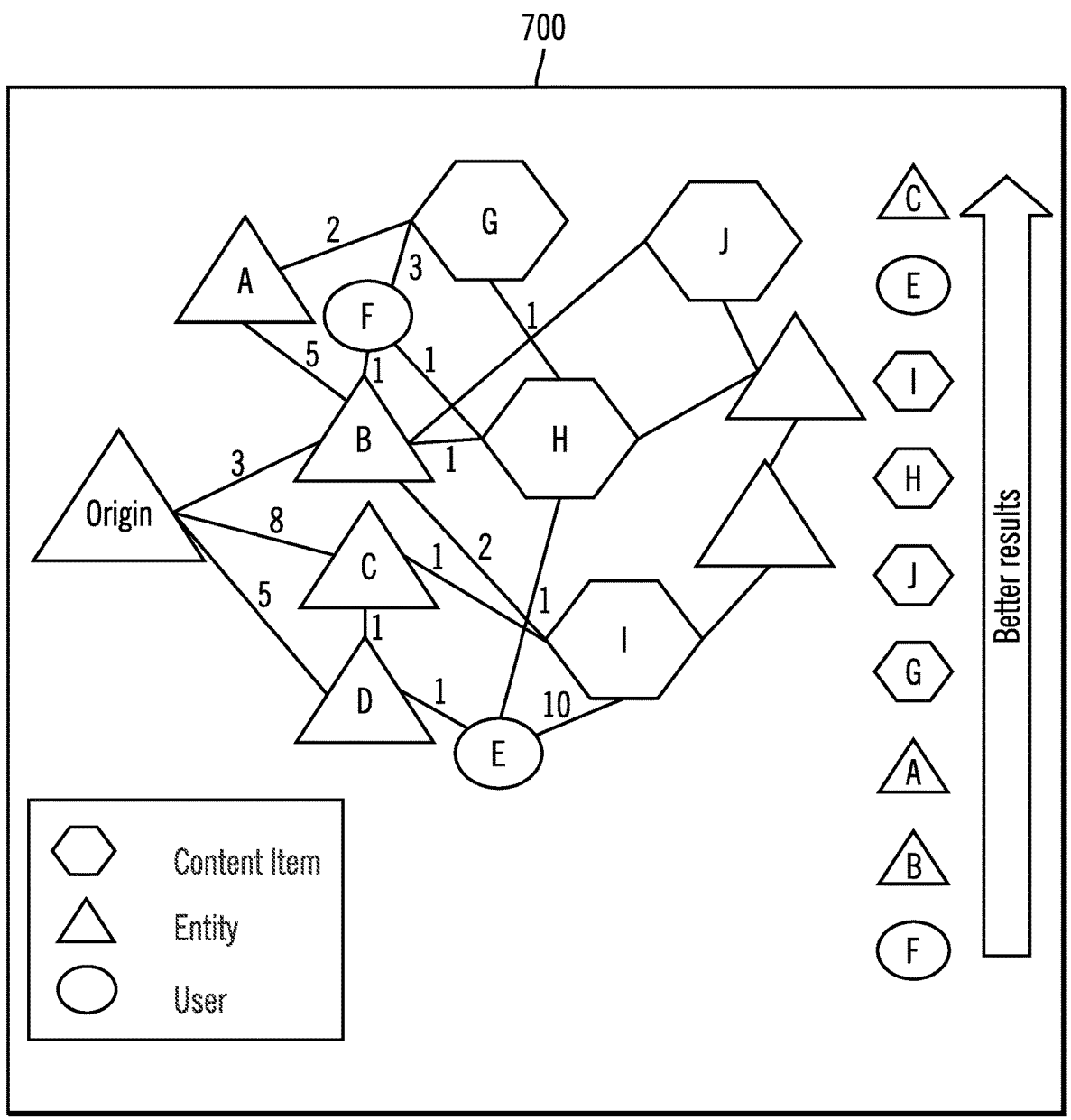
FIG. 7 illustrates a semantic graph with a list of sorted vertices in accordance with certain embodiments.

FIG. 7 illustrates a display 700 with a semantic graph and a list of sorted target vertices in accordance with certain embodiments. The list of sorted target vertices includes: C E, I, H, J, G, A, B, F. The list of sorted target vertices are provided as search results in response to a search request. The display 700 of FIG. 7 depicts the search traversal and results ranking. In this example, a maximum length of the search traversal is three vertices, and the distance factor (a multiplier for each edge away from the origin vertex) is 0.5.

Although this is a simple example, it can be seen that the results are nuanced and favor heavily connected target vertices (E and I). A search for content items would filter out non-content item results (of entities and users), yielding I, H, J, and G (in that order). A search for entities yields C, A, and B (in that order). In this example, entity D is not provided in the list of sorted target vertices. A search for users yields E and F (in that order). Thus, these results are more likely to be useful to a user than a simple text search, which may include all the vertices or none.

The semantic graph search approach has additional advantages over existing techniques. It is easily adaptable to perform different types of searches, such as subject matter expert search (e.g., searching for a type of user), social network search, search for related content, or preemptive search for content the user may be interested in.

With embodiments, search results may be surfaced through a user interface and may need to be merged with results from another search technique, such as straight text search. With embodiments, when the semantic graph is displayed, if a user selects a vertex, then the semantic search engine 110 highlights each path from that vertex that was found using the search.

With embodiments, one semantic graph may be created with a large number of content items. With other embodiments, many semantic graphs may be created for subsets of content items (e.g., one semantic graph for documents about computers and another semantic graph for documents about ocean animals). The semantic graphs may be tailored to types of content items to result in smaller, more focused semantic graphs, which advantageously speed up searches for entities.

Thus, embodiments provide content aware semantic graphing. Embodiments also provide content aware semantic graphing for searching supported by ranking.

Embodiments incorporate multiple types of vertices (content items, entities, and users), as well as, the relationships between them. For example, embodiments may use content and metadata from text documents to find or recommend users. As another example, embodiments may use the relationships between users to find documents.

Moreover, with embodiments, all indexed content and associated entities and users may be represented in a single unified graph that is searched efficiently using the semantic search engine 110.

Embodiments also provide tunable parameters that may be altered, manually or programmatically, based on metrics gleaned from user activity and feedback to improve result quality. Examples of tunable parameters include strength of relationships, weights, a maximum length of the search traversal, and a distance factor.

Figure 8:
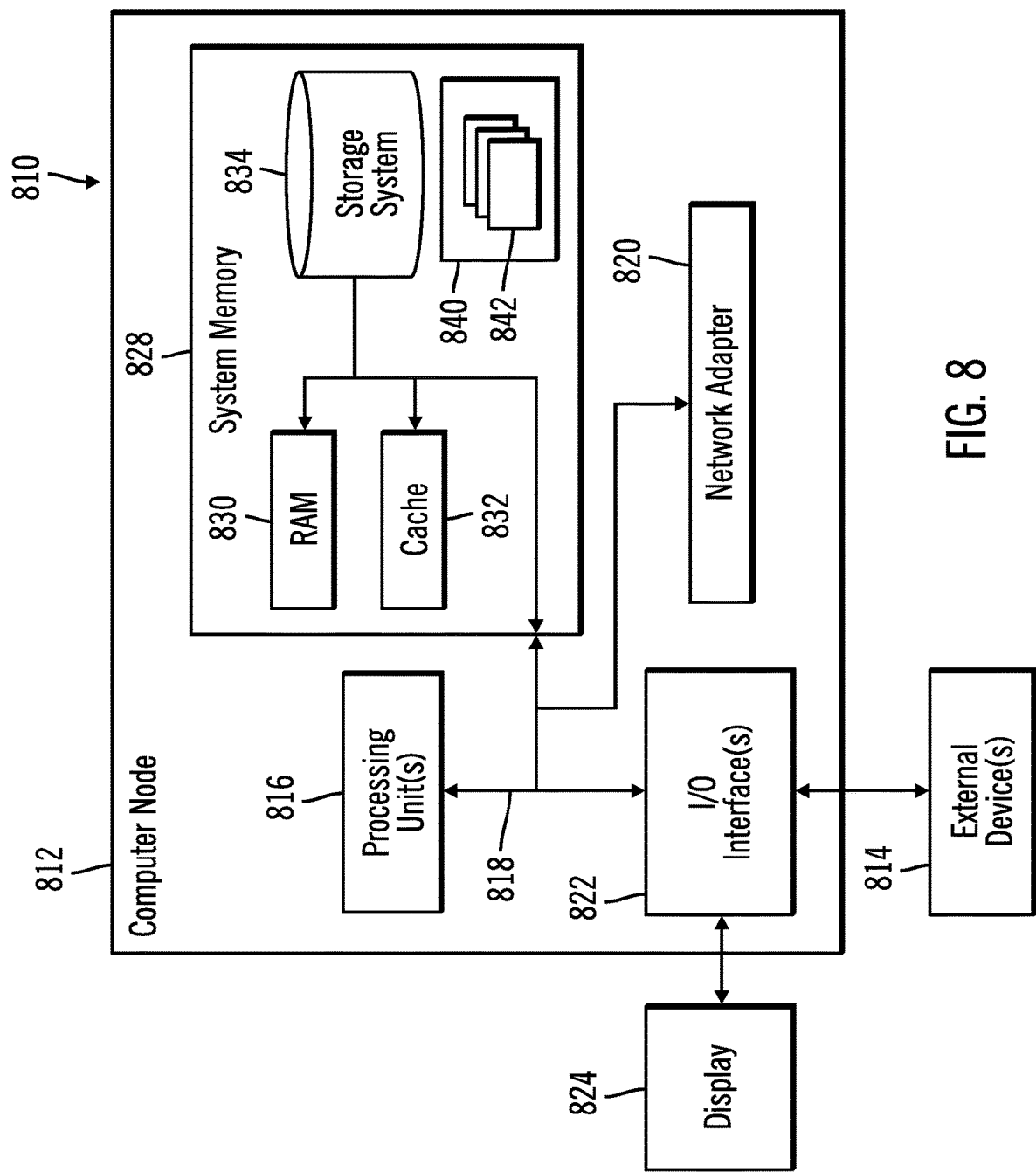
FIG. 8 illustrates a computing node in accordance with certain embodiments.

FIG. 8 illustrates a computing environment 810 in accordance with certain embodiments. In certain embodiments, the computing environment is a cloud computing environment. Referring to FIG. 8, computer node 812 is only one example of a suitable computing node and is not intended to suggest any limitation as to the scope of use or functionality of embodiments of the invention described herein. Regardless, computer node 812 is capable of being implemented and/or performing any of the functionality set forth hereinabove.

The computer node 812 may be a computer system, which is operational with numerous other general purpose or special purpose computing system environments or configurations. Examples of well-known computing systems, environments, and/or configurations that may be suitable for use with computer node 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 812 may be described in the general context of computer system executable instructions, such as program modules, being executed by a computer system. Generally, program modules may include routines, programs, objects, components, logic, data structures, and so on that perform particular tasks or implement particular abstract data types. Computer node 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer node 812 is shown in the form of a general-purpose computing device. The components of computer node 812 may include, but are not limited to, one or more processors or processing units 816, a system memory 828, and a bus 818 that couples various system components including system memory 828 to one or more processors or processing units 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 812 typically includes a variety of computer system readable media. Such media may be any available media that is accessible by computer node 812, and it includes both volatile and non-volatile media, removable and non-removable media.

System memory 828 can include computer system readable media in the form of volatile memory, such as random access memory (RAM) 830 and/or cache memory 832. Computer node 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, system memory 828 may include at least one program product having a set (e.g., at least one) of program modules that are configured to carry out the functions of embodiments of the invention.

Program/utility 840, having a set (at least one) of program modules 842, may be stored in system memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer node 812 may also communicate with one or more external devices 814 such as a keyboard, a pointing device, a display 824, etc.; one or more devices that enable a user to interact with computer node 812; and/or any devices (e.g., network card, modem, etc.) that enable computer node 812 to communicate with one or more other computing devices. Such communication can occur via Input/Output (I/O) interfaces 822. Still yet, computer node 812 can communicate with one or more networks such as a local area network (LAN), a general wide area network (WAN), and/or a public network (e.g., the Internet) via network adapter 820. As depicted, network adapter 820 communicates with the other components of computer node 812 via bus 818. It should be understood that although not shown, other hardware and/or software components could be used in conjunction with computer node 812. Examples, include, but are not limited to: microcode, device drivers, redundant processing units, external disk drive arrays, RAID systems, tape drives, and data archival storage systems, etc.

In certain embodiments, the computing device 100 has the architecture of computer node 812. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
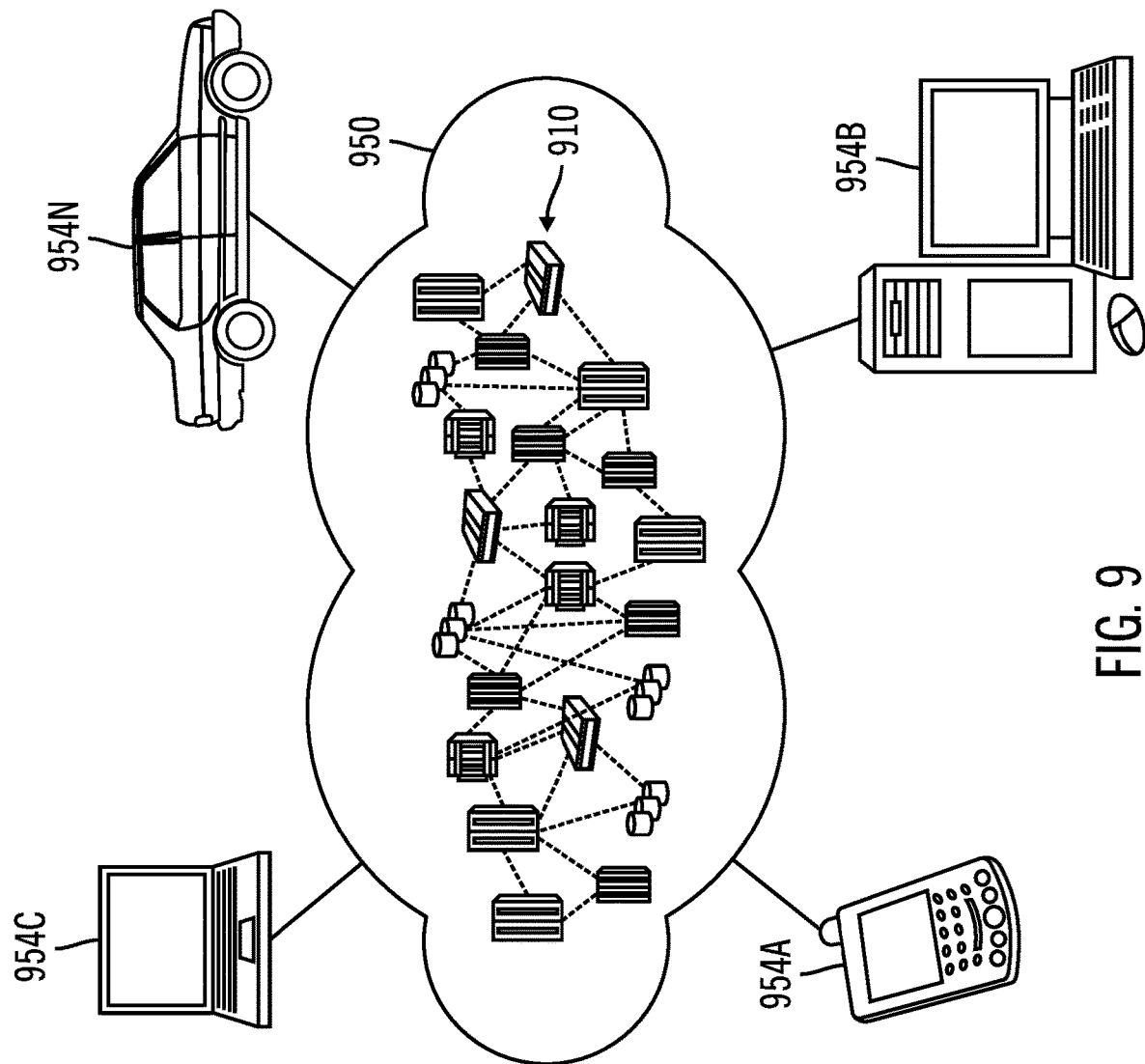
FIG. 9 illustrates a cloud computing environment in accordance with certain embodiments.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
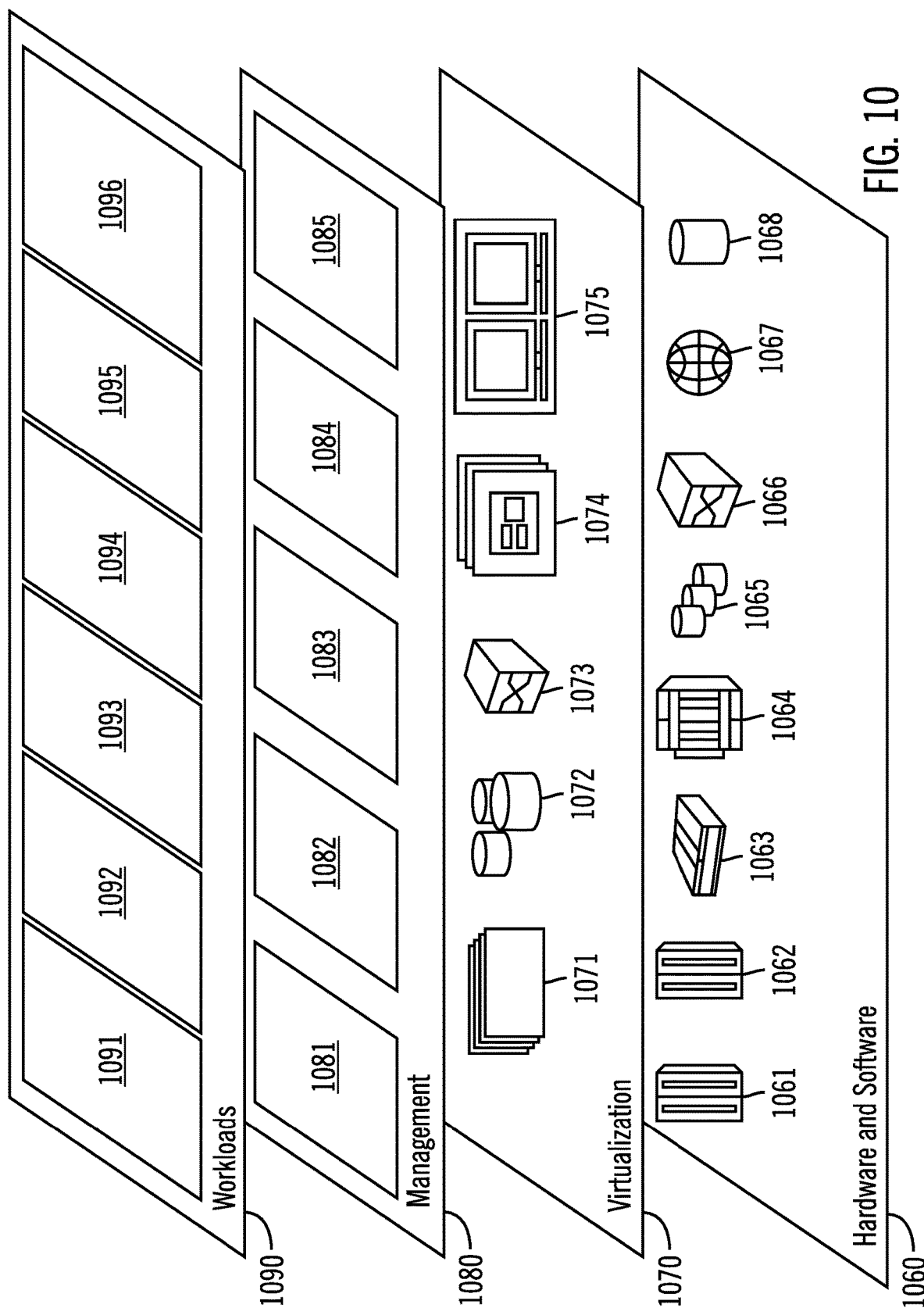
FIG. 10 illustrates abstraction model layers in accordance with certain embodiments.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and performing semantic graph search 1096.

Thus, in certain embodiments, software or a program, implementing semantic graph search in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising operations for:
    performing semantic extraction on content items to identify topics;
    generating a semantic graph with a vertex for each of the content items, each of the topics, and each user associated with any of the content items and with edges between vertices representing relationships, wherein each of the content items, each of the topics, and each user comprise entities;
    generating a vertex structure that contains identifiers of the entities and pointers, from the vertex structure, to vertices of those entities in the semantic graph;
    in response to receiving a new content item with an associated entity:
        determining that the associated entity is found in the vertex structure; and
        updating one or more edges in the semantic graph for the associated entity; and
    in response to receiving a search request with a search term;
        determining that the search term maps to an entity that is found in the vertex structure;

setting a vertex in the semantic graph that is pointed to by an identifier of the identifiers for the entity in the vertex structure as an origin vertex for the search request;

searching the semantic graph with a breadth-first search from the origin vertex to each target vertex of a plurality of target vertices to identify paths that have weights;

for each target vertex, generating a total weight based on the weights of one or more paths to that target vertex; and displaying the semantic graph with the vertex structure and with a sorted list of the plurality of target vertices based on the total weight of each target vertex.

2. The computer-implemented method of claim 1, further comprising operations for:

in response to determining that the search term does not map to an entity of the entities in the vertex structure, creating a new vertex in the semantic graph for the entity.

3. The computer-implemented method of claim 1, wherein the breadth-first search from the origin vertex to each target vertex is performed until a configured number of vertices have been visited.

4. The computer-implemented method of claim 1, further comprising operations for:

sorting the plurality of target vertices based on the total weight of each target vertex.

5. The computer-implemented method of claim 4, wherein each of the edges is encoded with metadata about a type of a relationship and a strength of the relationship and further comprising operations for:

filtering the target vertices based on a type of the relationship.

6. The computer-implemented method of claim 1, wherein a Software as a Service (SaaS) is configured to perform the operations of the method.

7. A computer program product, the computer program product comprising a computer readable storage medium having program code embodied therewith, the program code executable by at least one processor to perform operations of:

performing semantic extraction on content items to identify topics;

generating a semantic graph with a vertex for each of the content items, each of the topics, and each user associated with any of the content items and with edges between vertices representing relationships, wherein each of the content items, each of the topics, and each user comprise entities;

generating a vertex structure that contains identifiers of the entities and pointers, from the vertex structure, to vertices of those entities in the semantic graph;

in response to receiving a new content item with an associated entity:

determining that the associated entity is found in the vertex structure; and updating one or more edges in the semantic graph for the associated entity; and in response to receiving a search request with a search term;

determining that the search term maps to an entity that is found in the vertex structure;

setting a vertex in the semantic graph that is pointed to by an identifier of the identifiers for the entity in the vertex structure as an origin vertex for the search request;

searching the semantic graph with a breadth-first search from the origin vertex to each target vertex of a plurality of target vertices to identify paths that have weights;

for each target vertex, generating a total weight based on the weights of one or more paths to that target vertex; and displaying the semantic graph with the vertex structure and with a sorted list of the plurality of target vertices based on the total weight of each target vertex.

8. The computer program product of claim 7, wherein the program code is executable by the at least one processor to perform operations of:

in response to determining that the search term does not map to an entity of the entities in the vertex structure, creating a new vertex in the semantic graph for the entity.

9. The computer program product of claim 7, wherein the breadth-first search from the origin vertex to each target vertex is performed until a configured number of vertices have been visited.

10. The computer program product of claim 7, wherein the program code is executable by the at least one processor to perform operations of:

sorting the plurality of target vertices based on the total weight of each target vertex.

11. The computer program product of claim 10, wherein each of the edges is encoded with metadata about a type of a relationship and a strength of the relationship, and wherein the program code is executable by the at least one processor to perform operations of:

filtering the target vertices based on a type of the relationship.

12. The computer program product of claim 7, wherein a Software as a Service (SaaS) is configured to perform the operations of the computer program product.

13. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

performing semantic extraction on content items to identify topics;

generating a semantic graph with a vertex for each of the content items, each of the topics, and each user associated with any of the content items and with edges between vertices representing relationships, wherein each of the content items, each of the topics, and each user comprise entities;

generating a vertex structure that contains identifiers of the entities and pointers, from the vertex structure, to vertices of those entities in the semantic graph;

in response to receiving a new content item with an associated entity:

determining that the associated entity is found in the vertex structure; and updating one or more edges in the semantic graph for the associated entity; and in response to receiving a search request with a search term;

determining that the search term maps to an entity that is found in the vertex structure;

setting a vertex in the semantic graph that is pointed to by an identifier of the identifiers for the entity in the vertex structure as an origin vertex for the search request;

searching the semantic graph with a breadth-first search from the origin vertex to each target vertex of a plurality of target vertices to identify paths that have weights;

for each target vertex, generating a total weight based on the weights of one or more paths to that target vertex; and displaying the semantic graph with the vertex structure and with a sorted list of the plurality of target vertices based on the total weight of each target vertex.

14. The computer system of claim 13, further comprising:

in response to determining that the search term does not map to an entity of the entities in the vertex structure, creating a new vertex in the semantic graph for the entity.

15. The computer system of claim 13, wherein the breadth-first search from the origin vertex to each target vertex is performed until a configured number of vertices have been visited.

16. The computer system of claim 13, further comprising:

sorting the plurality of target vertices based on the total weight of each target vertex.

17. The computer system of claim 16, wherein each of the edges is encoded with metadata about a type of a relationship and a strength of relationship and further comprising:

filtering the target vertices based on a type of the relationship.

18. The computer system of claim 13, wherein a Software as a Service (SaaS) is configured to perform the operations of the computer system.

* * * * *